United States Patent [19]
Yarnell

[11] 3,899,349
[45] Aug. 12, 1975

[54] CARBON DIOXIDE CURING OF PLATES FOR LEAD-ACID BATTERIES

[75] Inventor: Charles Frederick Yarnell, Somerville, N.J.

[73] Assignee: Bell Telephone Laboratories, Incorporated, Murray Hill, N.J.

[22] Filed: Feb. 6, 1974

[21] Appl. No.: 440,152

[52] U.S. Cl. ................................. 136/27; 136/33
[51] Int. Cl.[2] ........................................ H01M 39/00
[58] Field of Search .......................... 136/33, 26, 27

[56] References Cited
UNITED STATES PATENTS

| | | | |
|---|---|---|---|
| 2,149,813 | 3/1939 | Lindstrom | 136/33 X |
| 2,656,399 | 10/1953 | Hindall et al. | 136/33 |
| 2,971,042 | 2/1961 | Townsend | 136/33 |
| 2,971,043 | 2/1961 | Townsend | 136/33 |
| 3,618,564 | 11/1971 | Dungs et al. | 136/33 X |

*Primary Examiner*—John H. Mack
*Assistant Examiner*—C. F. Lefevour
*Attorney, Agent, or Firm*—W. G. Nilsen

[57] ABSTRACT

Lead-acid batteries utilizing both positive and negative electrodes are prepared using a specific procedure for curing of these electrodes. This curing procedure involves use of a carbon dioxide enriched atmosphere and the presence of water. This procedure permits rapid curing of the electrodes without subsequent separation of the active material from the electrode grid. The procedure is particularly applicable to nonreactive grid pastes such as tetrabasic lead sulfate since separation of active material from electrode grid is a particularly serious problem in such cases.

9 Claims, 4 Drawing Figures

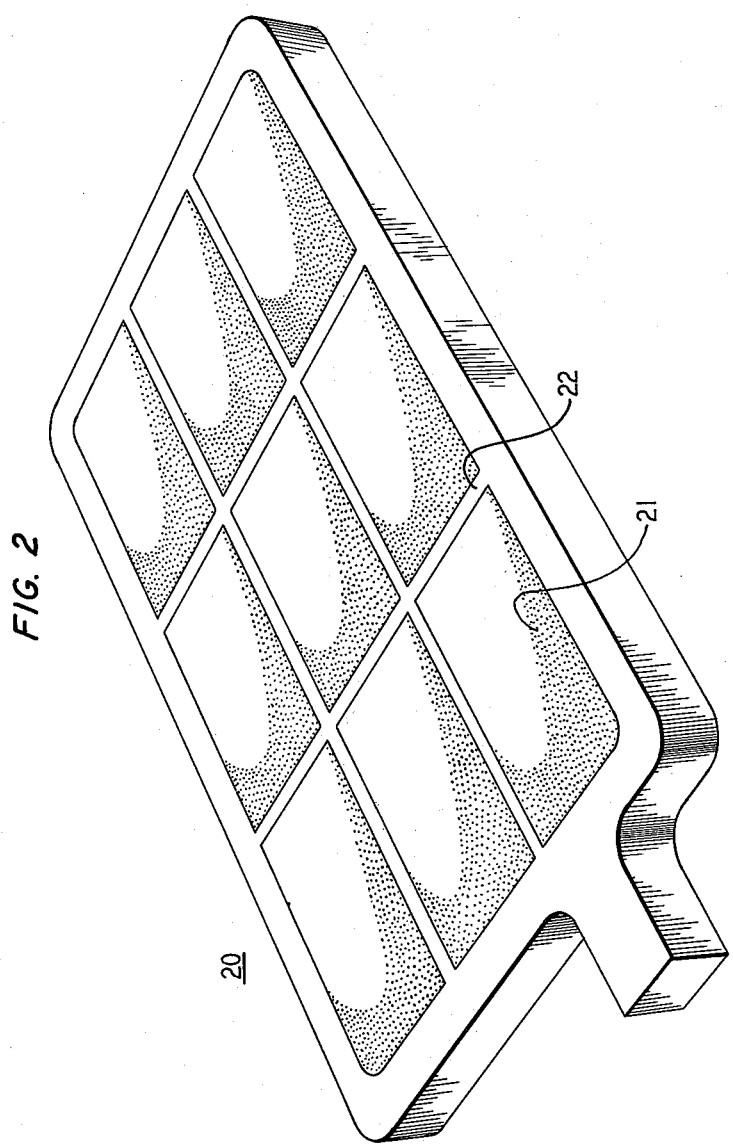

CARBON DIOXIDE CURING OF PLATES FOR LEAD-ACID BATTERIES

BACKGROUND OF THE INVENTION

1. Field of the Invention

The invention relates to processes for the manufacture of lead-acid secondary batteries. In particular it relates to the curing of electrodes for lead-acid secondary batteries.

2. Description of the Prior Art

The lead-acid secondary battery is extensively used as a portable source of power both in automobiles and other vehicles and as a standby source of power in industrial plants and telephone exchanges, etc. It is extremely significant commercially; the annual production amounting to millions of units.

Although production has been extensive, actual scientific understanding of the processes involved in production of lead-acid batteries has been lacking. Many of the processes used commercially in the production of lead-acid batteries have been unchanged for many years. One such process is generally referred to as the curing operation. It is observed that when this curing operation is not performed on the plate, the pellets in the plate pop out or shed from the grid during formation of the plate.

Shedding of the active material from the grid structure is detrimental to battery performance in several ways. First, some active material is lost which decreases the capacity of the electrode. Second, it limits the life of the battery because active material shorts across the electrodes. Third, it increases the internal resistance because the active material becomes loosely packed and is not in close contact with the conducting part (the grid) of the electrode.

The curing process presently used involves slow drying of the paste material in the grid. Although such procedures often produce perfectly satisfactory plates from the standpoint of shedding of active material from the grid structure, this procedure is time consuming and disadvantageous economically. This is true of both reactive pastes (where the reaction which yields the active material takes place during the pasting operation) and nonreactive paste material (where the paste is made of the active material).

In the case of a nonreactive paste material such as tetrabasic lead sulfate, the curing procedure is even more disadvantageous. Since no reaction takes place during the pasting operation, there is no tendency for the active material to reactively adhere together. Thus, nonreactive paste materials have a greater tendency to separate from the grid. Also, in the case of the reactive paste some period of time must unavoidably be used to allow for reaction of the sulfuric acid with the lead oxide. In contrast to the reactive pastes, the electrodes made from nonreactive pastes such as tetrabasic lead sulfate are ready for forming immediately after the pasting operation and any reduction in the time for curing the electrode has immediate economic savings. Also, formation with tetrabasic lead sulfate in dilute sulfuric acid (Sp. gr. 1.003–1.030) is preferred but this increases the tendency of the paste to separate from the grid.

SUMMARY OF THE INVENTION

The invention is a process for the fabrication of lead-acid batteries in which the electrodes are cured by exposing them to an atmosphere enriched with carbon dioxide in the presence of water. Although a curing atmosphere with as little as 5 percent by weight of carbon dioxide can be used greater than 50 percent is preferred because of more rapid processing. Water is introduced in the form of water vapor. For example, $CO_2$ enriched atmosphere with relative humidity above 40 percent yields satisfactory results. Relative humidities above 50 or 60 percent are preferred because of more rapid processing. More rapid curing is obtained by heating the curing atmosphere above room temperature. A temperature of 90°–200° C is preferred. Below 90° C, curing rate is reduced; above 200° C, no advantage is obtained. Also, it is beneficial to have the plate at a lower temperature (at least a few degrees C) than the $CO_2$ enriched atmosphere. A particularly convenient method of carrying out the invention is to use a curing atmosphere produced by heating $CO_2$ and introducing water vapor by boiling water to produce steam. This is referred to as the steam-carbon dioxide atmosphere. Particularly significant is the reduction in curing time necessary to produce equivalent electrodes. Curing time is reduced to two hours or less by use of the inventive procedure. The procedure is beneficial to both positive and negative electrodes. However, other considerations in industrial manufacturing procedures may make it economically desirable to treat just one (the positive and not the negative or the negative and not the positive electrode) electrode rather than both electrodes. Cohesion of the active material is improved which makes possible the use of a more open grid structure. This improves capacity since it increases the amount of active material present per unit weight. The process is particularly significant where tetrabasic lead sulfate is used as the paste material since curing time is reduced from a period of time as high as several days to a period of 1 hour.

BRIEF DESCRIPTION OF THE DRAWING

FIG. 2 is a side view of an electrode grid with active material prepared in accordance with the invention;

DETAILED DESCRIPTION

1. Preparation of the Pasted Electrode

Figure 1:
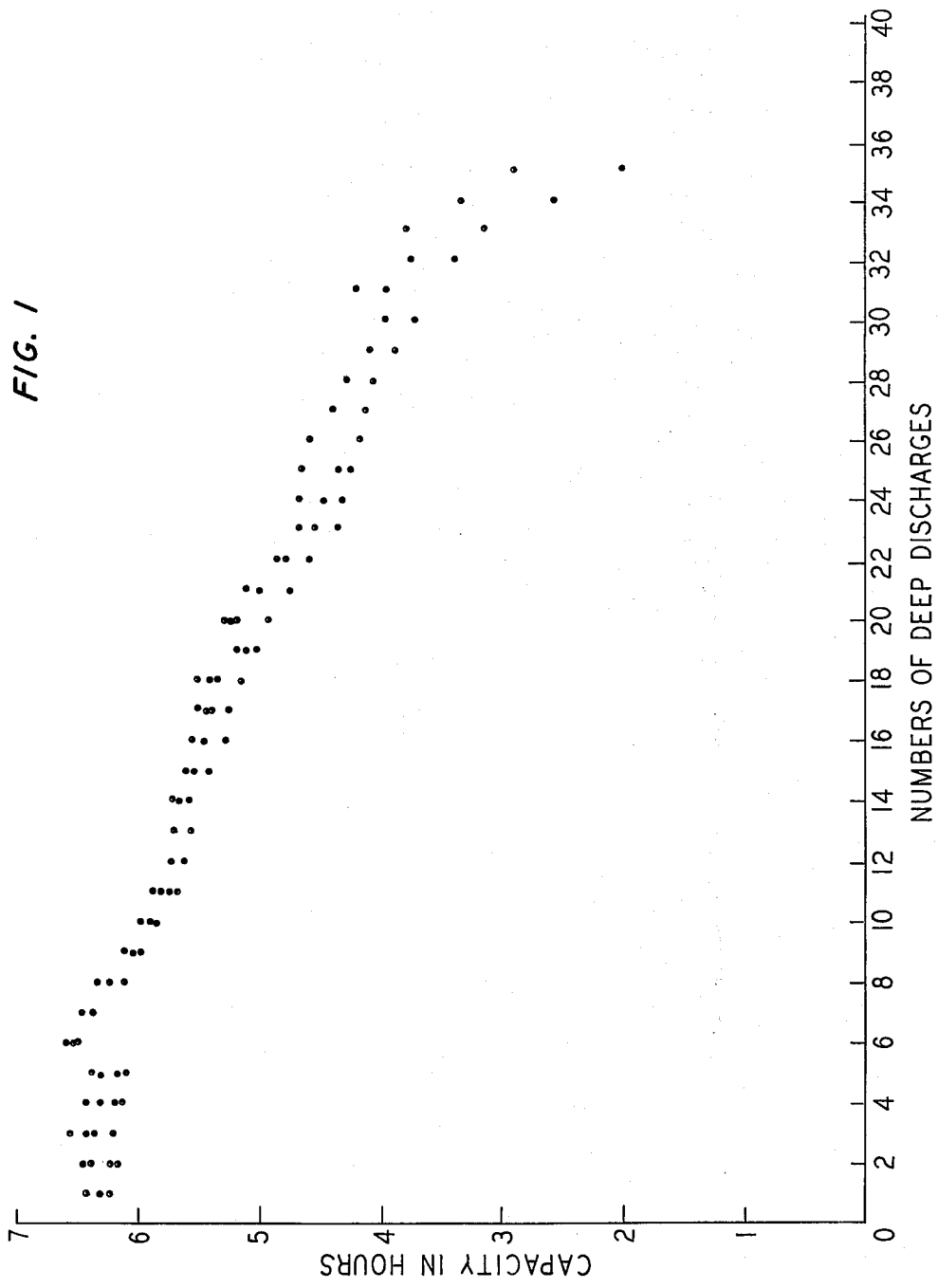
FIG. 1 on coordinates of capacity in hours against number of discharge cycles is a plot showing capacity for an electrode made in accordance with the invention.

The preparation of active electrodes for lead-acid batteries conventionally involves three steps. First, a pasted grid is produced, then the pasted grid is cured and the pasted and cured grid is formed (usually by electrolytic formation) to produce the active materials used in the charged lead-acid battery. The method of preparation of the pasted grid is not critical to the practice of the invention. Also, the invention is applicable to both reactive and nonreactive pastes. The curing procedure depends on the paste containing at least some basic compound.

The preparation of pasted grids using reactive and nonreactive pastes differ somewhat. Typically, reactive pastes are composed largely of lead and/or lead oxide, sulfuric acid and water. Amounts of constituents depend largely on desired paste consistency, desired rate of reaction, temperature of reaction, whether positive or negative electrode is being made, etc. Small amounts of other materials are often added to improve various properties of the electrode such as porosity, shock resistance, charge and discharge rates, etc. A typical example is the use of expanders to improve electrode characteristics of the negative. It should be noted that in this procedure a reaction takes place during the pasting operation to produce the substance which is eventually formed into the active electrode material of the charged lead-acid battery. Formation may be carried out by conventional means.

Where nonreactive pastes are used, the substance to be formed in the electrode is made in a fabrication procedure separate from the pasting procedure. A number of substances can be used to make the nonreactive paste including, for example, monobasic lead sulfate, tribasic lead sulfate and tetrabasic lead sulfate. As has been disclosed in U.S. Pat. No. 3,765,943, issued Oct. 16, 1973 for positive electrodes and an article for negative electrodes (*Journal of Electrochemical Society* Vol. 119, page 19 (1972)), the use of tetrabasic lead sulfate is quite advantageous. In the case of nonreactive pastes, the paste is made by mixing the material to be formed with a liquid such as water to a consistency suitable for application to the grid. Application of the paste materials to the grid is conventional.

Particularly significant is the use of the inventive process for tetrabasic lead sulfate electrodes formed in dilute sulfuric acid (Sp. gr. 1.003–1.030). Here, popping or shedding of active material is a more serious problem than in more concentrated sulfuric acid. Use of the inventive procedure eliminates popping and shedding during formation in the dilute acid. Formation of positive tetrabasic lead sulfate electrodes in dilute sulfuric acid is more efficient in that a greater fraction of current takes part in the formation process (see, "The Oxidation of Tetrabasic Lead Sulfate to Lead Dioxide in the Positive Plate of the Lead-Acid Battery" by C. F. Yarnell and M. C. Weeks, *Extended Abstracts for the Fall Meeting Miami Beach, Florida*, Oct. 8–13, 1972, The Electrochemical Society, Inc. Princeton, N.J. 08540). Formation of the negative electrode in dilute acid is advantageous because it eliminates blistering (see, "Mechanism of the Formation of Blisters on the Lead electrode of the Lead-Acid Battery" by C. F. Yarnell, *Journal of the Electrochemical Society*, Vol. 119, page 19 (1972)).

2. The Curing Procedure

The invention can be carried out using a large variety of procedures. Essential to each procedure is that the pasted electrode be exposed to an enriched atmosphere of carbon dioxide while water in the form of water vapor is in contact with the paste material. Atmospheres with as little as 5 percent carbon dioxide and a relative humidity of at least 40 percent are effective. However, higher percentages of carbon dioxide are preferred because curing can be carried out much more rapidly. For example, an atmosphere containing 50 percent carbon dioxide results in much more rapid curing than 5 percent. Also, an atmosphere of 90 percent carbon dioxide or even an atmosphere consisting substantially of carbon dioxide and water vapor is preferred because such atmospheres are not difficult to obtain under manufacturing conditions and lead to more rapid results.

Water is introduced in the form of water vapor. The curing operation requires an atmosphere with a relative humidity of at least 40 percent. Higher relative humidities such as at least 50 percent or at least 60 percent are preferred because of more rapid curing. The curing atmosphere may be produced in a variety of ways provided the essential requirements of enriched carbon dioxide atmospheres and the presence of water vapor are met. For example, the enriched carbon dioxide atmosphere may be obtained by the use of dry ice in an enclosed atmosphere. More rapid results are obtained where the curing atmosphere is heated above room temperature. A temperature range of 90°–200° C in the vicinity of the curing electrode is preferred. At curing atmospheres above room temperatures, more rapid curing is obtained by maintaining the temperature of the partially dried plate below that of the curing atmosphere. A temperature differential of several degrees is sufficient to provide some benefits. Increased temperature differential (say, 20°, 40° or 60° C or even more) provides increased benefits. The temperature of the plate should be maintained above the freezing point of water since freezing water interferes with the curing process.

The invention is conveniently illustrated by the description of a specific procedure used in curing electrodes. Data is presented which shows that the capacity of electrodes made in accordance with this procedure is the same as the capacity of electrodes made in accordance with presently used procedures which require considerably more time. The grids were made from lead calcium alloy and measured $5/32 \times 2\frac{1}{2} \times 4$ inches. The grids were pasted with a commercial reactive paste containing lead oxide, lead, red lead, sulfuric acid and water. Some pasted grids were air dried for approximately 2 days in accordance with the procedure generally used in the industry. Other grids were treated in accordance with the inventive procedure. They were pasted and then immediately dried at 300° F for 1 hour, cooled for 10 minutes, placed in a steam-carbon dioxide atmosphere for 3 minutes and cooled for 10 minutes. The steam-$CO_2$ atmosphere was prepared by bubbling $CO_2$ through heated water and introducing additional water vapor by boiling water inside the enclosed chamber containing the atmosphere. The relative humidity was approximately 70 percent. The atmosphere exclusive of water vapor was at least 80 percent $CO_2$. Although the inventive procedure is beneficial to both positive and negative electrodes, these particular plates were formed into positive electrodes. The resulting capacities at the 6 hour rate are given in table 1 in units of ampere-hours per gram. Capacities were measured to a discharge voltage of 1.75 volts. The first three grids were formed in aqueous sulfuric acid of specific gravity 1.005; the last grid in specific gravity 1.050.

TABLE I

| Cycle Number | Comparison of Electrodes | | | | |
|---|---|---|---|---|---|
| | 1 | 2 | 3 | 4 | 6 |
| $CO_2$-Steam | .0542 | .0648 | .0705 | .0729 | .0756 |
| $CO_2$-Steam | .0553 | .0649 | .0697 | .0718 | .0743 |
| Air Dried for two days | .0563 | .0622 | .0675 | .0693 | .0723 |
| Air Dried | .0622 | .0678 | .0700 | .0704 | .0741 |

TABLE I-Continued

| | Comparison of Electrodes | | | | |
|---|---|---|---|---|---|
| Cycle Number | 1 | 2 | 3 | 4 | 6 |
| for two days | | | | | |

As can be seen from the table, the capacities of the electrodes cured by presently used methods (air drying for 2 days) and those cured according to the inventive procedure are essentially equal. The variations are within the experimental error expected in this type of experiment. Particularly noteworthy is the fact that the inventive curing procedure can be carried out in less than 2 hours whereas the procedure presently used requires approximately 2 days.

Experiments were also carried out using a nonreactive paste where the grids (¼ × 2½ × 4 inches) were pasted, rapidly dried, cooled and exposed to a steam-carbon dioxide atmosphere. The atmosphere was prepared in the same way as the above-described experiments on reactive pastes. These plates were then formed and their capacity measured as a function of numbered deep discharges. The cycling routine is described in detail by R. V. Biagetti and M. C. Weeks, *Bell System Technical Journal*, Vol. 49, page 1317 (1970) entitled "Tetrabasic Lead Sulfate as a Paste Material for Positive Plates". The results of these experiments are shown in FIG. 1. In these experiments the electrodes were discharged at a current of 1.3 amperes until the voltage was reduced to a value of 1.75 volts. These discharged characteristics are the same as the discharge characteristics of tetrabasic lead sulfate electrodes made in accordance with standard procedures which require at least 3 days of air drying at a relative humidity above 40 percent.

Experiments were carried out at room temperature in an enriched $CO_2$ atmosphere. The atmosphere was prepared in a container with a volume of approximately 20 liters. This volume contains approximately 25 grams of air.

About 3 grams of dry ice (enough to produce an atmosphere of about 12 percent by weight of $CO_2$) was introduced into the container. Humidity was introduced by placing a beaker of water in the container. After exposing a plate to this curing atmosphere for 16 hours, it showed no evidence of popping or shedding during formation. Other experiments as well as this experiment indicate that curing atmospheres with as little as 5 percent carbon dioxide reduces curing time significantly.

Comparison experiments were also carried out with grids pasted with tetrabasic lead sulfate. The sizes of the grids were different from those used to obtain the data in Table I. Eight plates were produced in accordance with the invention using the steam-$CO_2$ procedure outlined above. The capacities in hours were 5.98, 5.90, 6.02, 5.92, 5.74, 6.11, 6.09, and 6.13. For plates dried in air (relative humidity of 50 percent) for 3 days, the capacities were 5.91, 5.76, 5.52 and 6.20. Within experimental error, the capacities are identical for plates prepared by the two curing procedures but the inventive procedure requires only 2 hours whereas typical procedures presently used require at least 3 days.

3. The Drawing

FIG. 2 shows a typical grid 20 with paste 21 prepared according to the inventive procedure. Particularly noteworthy is the open grid structure 22 (compared to the conventionally used grids) made possible by the inventive procedure which results in greater adherence of the active material to the plate. This leads to greater capacity because a greater percentage of the grid volume is filled with active material.

Figure 3:
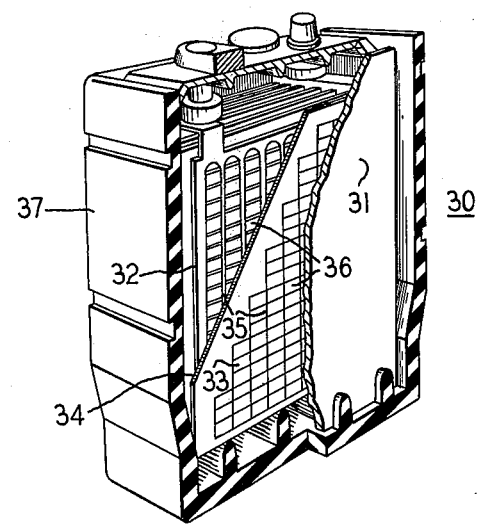
FIG. 3 is a perspective view partly in section showing a typical lead-acid battery utilizing electrodes prepared according to the inventive process.

The device of FIG. 3 is in its fundamental design one cell of a characteristic rectangular battery 30 which is made up of two or more cells separated by a partition 31. Each cell is provided with vertical positive electrodes 32 and negative electrodes 33, insulated from one another by a separator 34. Both electrodes are commonly made up of grids 35 the interstices of which are filled with pellets 36 of the active materials. In the instance of the positive electrodes, the pellets in the charged state are $PbO_2$. The pellets of the negative electrodes are metallic lead in the charged state. The positive and negative electrodes are prepared in accordance with the inventive process. Commonly, grids utilized in structures of the type depicted, while primarily lead, contain alloying elements such as antimony and/or calcium to improve strength. Spaces within case 37 between separators 34 are filled with electrolyte which is generally aqueous sulfuric acid.

Figure 4:
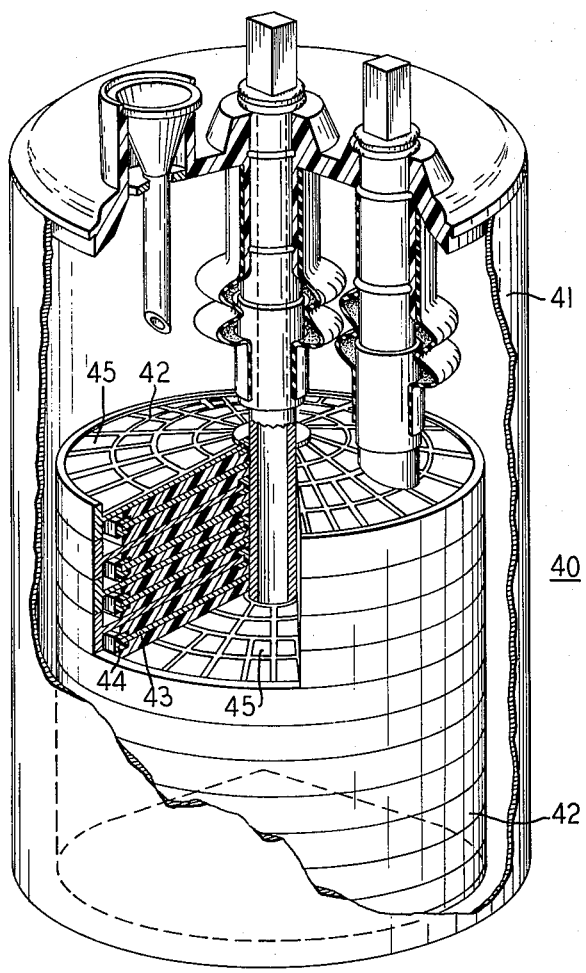
FIG. 4 is a perspective view partly in section of an alternative battery structure.

The structure of FIG. 4 is a design currently in use as a long term standby source of power. Structurally, this apparatus 40 includes an outer container 41, horizontally disposed positive electrodes 42 and negative electrodes 43 which may be conical in shape. Electronic isolation is accomplished by means of separators 44. While there are several distinguishing characteristics of engineering significance in structures of the type depicted, it is sufficient from the standpoint of this description to note that positive electrodes 42 and negative electrodes 43 are prepared in accordance with the outlined procedure.

What is claimed is:

1. Process for the fabrication of lead-acid batteries containing positive electrodes, negative electrodes and electrolyte which includes the steps of pasting the positive and negative electrodes with a paste consisting essentially of tetrabasic lead sulfate, substantially drying the positive and negative electrodes before curing, curing the positive and negative electrodes and forming the positive and negative electrodes in aqueous sulfuric acid characterized in that at least one electrode is cured in a curing atmosphere which consists essentially of carbon dioxide and water vapor and the electrodes are maintained at a temperature below the temperature of the curing atmosphere but above the freezing point of water during at least part of the curing.

2. Process of claim 1 in which the atmosphere contains at least 50 percent by weight of carbon dioxide.

3. Process of claim 2 in which the atmosphere contains at least 90 percent by weight of carbon dioxide.

4. The process of claim 1 in which the relative humidity is at least 50 percent.

5. The process of claim 4 in which the relative humidity is at least 60 percent.

6. Process of claim 1 in which the aqueous sulfuric acid used in the formation has a specific gravity between 1.003 and 1.030.

7. Process of claim 1 in which the curing atmosphere in the vicinity of the electrode is at a temperature between 90° and 200°C.

8. Process of claim 7 in which the water vapor is introduced into the curing atmosphere by boiling liquid water.

9. Process of claim 1 in which both the positive and negative electrodes are cured in the curing atmosphere.

* * * * *